P. H. STANDISH.
Machinery for Coiling Metal Rods or Bars.
No. 224,852. Patented Feb. 24, 1880.
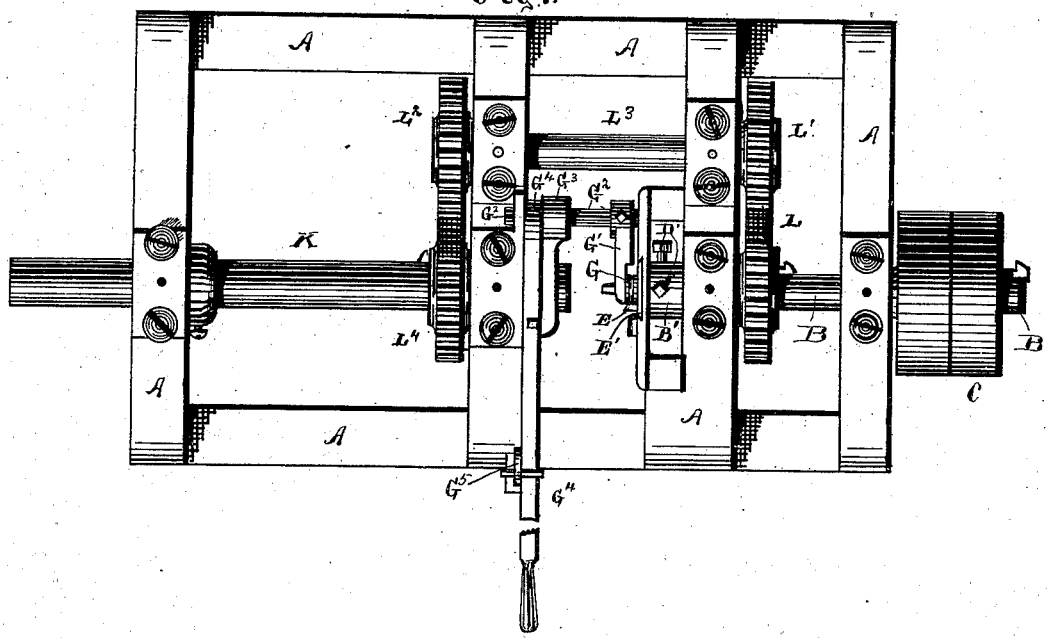
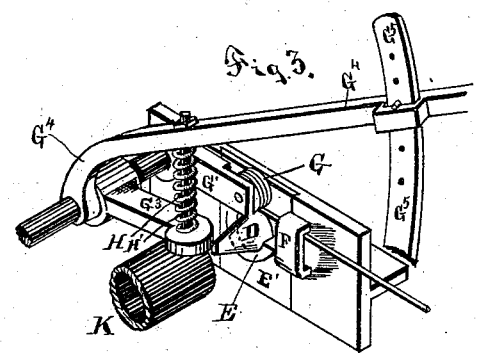
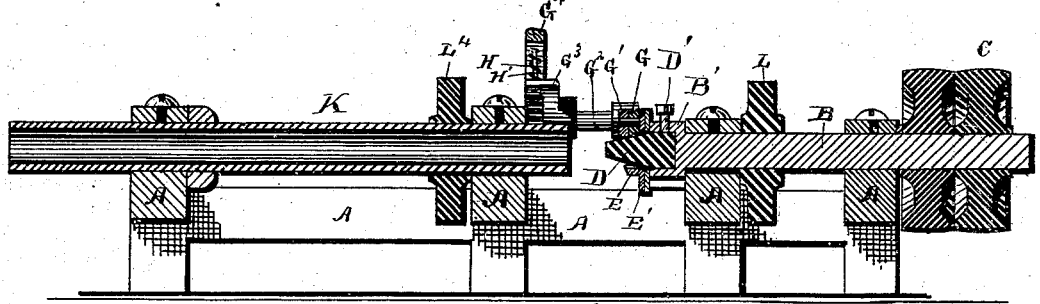
WITNESSES
Frank M. Faber
Willard Fracker
INVENTOR
Philoridge H. Standish
By Liggett & Liggett
ATTORNEYS

UNITED STATES PATENT OFFICE.

PHILANDER H. STANDISH, OF CUYAHOGA FALLS, OHIO.

MACHINERY FOR COILING METAL RODS OR BARS.

SPECIFICATION forming part of Letters Patent No. 224,852, dated February 24, 1880.

Application filed October 23, 1879.

*To all whom it may concern:*

Be it known that I, PHILANDER H. STANDISH, of Cuyahoga Falls, in the county of Summit and State of Ohio, have invented certain new and useful Improvements in Machinery for Coiling Metal Bars or Rods; and I do hereby declare the following to be a full, clear, and exact description of the invention, such as will enable others skilled in the art to which it pertains to make and use it, reference being had to the accompanying drawings, which form part of this specification.

My invention relates to machinery for coiling metal bars or rods; and it consists of the parts and combination of parts hereinafter described and claimed.

In the drawings, Figure 1 is a plan view of a device according to my invention; Fig. 2, a view, in longitudinal section, thereof; Fig. 3, a detached view, showing in detail the former or mandrel and the stationary cam or discharging face, operating, in connection with said mandrel, to strip or free the rod therefrom as fast as coiled, also showing the pressure-roller and its connection with its manipulating-lever, together with the device whereby spring-pressure may be exerted downward upon said roller.

In the said drawings, A is a frame, of metal or of any suitable material, of any required dimensions or character to accommodate the working parts of my device. B is a shaft driven by a pulley, C, or by any suitable device for the application of driving-power. The shaft B has a hollow or recessed end, B′, into which is adjustably fixed the mandrel or former D. Suitable set-screws D′, or equivalent locking device, are provided and operate to retain the mandrel D in any adjusted position. By the provision of the hollow or recess B′ of the shaft B, the mandrel D, as it wears, can be fed out and reshaped, if necessary, thus enabling a single piece of material to be used a greater length of time and with less expense than could be possible if, whenever the mandrel D should become worn or damaged, an entirely new part should have to be provided. From the construction thus far specified it will be evident that the mandrel or former D will be revolved by the driving-shaft B.

E is a stationary discharging-surface, placed in such juxtaposition with the mandrel D that it shall act to strip or discharge the coiled bar from the mandrel as fast as it is formed during the operation of the machine.

I have here shown the surface E constructed in the shape of a cam or gradually-projecting surface. While preferring this construction, I do not narrowly limit myself to its use, as other shaped surfaces might perform the same result.

In order to facilitate repair, I prefer forming the surface E upon a separate plate, E′, and this plate may be attached in position by any suitable means. I have here shown a dovetailed tongue-and-groove connection, whereby the plate E′ may be placed and retained in proper position.

F is a suitable loop, rest, or equivalent guiding mechanism, through or past which the metal rod is fed to the mandrel D. G is a pressing-roller, between which and the mandrel D the rod is held while being bent into spiral form. I have shown the element G, just named, in the form of a roller, as in that form it would offer less friction than though the pressing mechanism were a solid immovable piece, and, while I prefer the roller on account of its anti-friction function, any other suitable device may be employed that shall operate to retain the rod upon the mandrel or former D.

The roller G is journaled to an arm, G′, fixed upon a shaft, $G^2$, journaled in the frame A. $G^3$ is an arm rigidly attached upon a shaft, $G^2$, and $G^4$ is a manipulating-lever, which may be loosely attached either upon the shaft $G^2$ or upon the frame A.

H is a spring interposed between the manipulating-lever $G^4$ and the arm $G^3$, and in order to retain the spring H in position a retaining-stem, H′, attached either to the lever $G^4$ or arm $G^3$, may be employed.

$G^5$ is a bar bent on the arc of a circle concentric with the pivot upon which the lever $G^4$ turns, and $G^6$ represent holes made in the bar $G^5$, through which a set-pin may be inserted to retain the manipulating-lever in any depressed position to which it may be adjusted.

By the construction just specified it will be seen that as the lever $G^4$ is depressed the spring H will exert its pressure upon the roller G through its arm G′, the shaft $G^2$, and arm $G^3$.

I prefer spring-pressure to that of a weight on account of its steadiness and equality, notwithstanding the up-and-down motions usually imparted to the roller G on account of the peculiar shape of the mandrel D.

K is a hollow or tubular receiver into which the coiled bar is discharged from the mandrel D. In case the rod while being coiled is cold the receiver K might be stationary; but as I have devised this machine more especially for coiling red-hot rods, (for the purpose of making chain-link blanks,) I construct the receptacle K so that it shall revolve with equal rapidity, or nearly so, and in the same direction with the mandrel D.

The method which I have here shown is sufficiently indicated in the drawings. A gear-wheel, L, upon the shaft B, drives the gears L' L², which are fixed to the common shaft L³, and the gear-wheel L² finally meshes with and drives gear-wheel L⁴, fixed upon the hollow receiver K, in such a manner as to turn it in the same direction as the mandrel D. The receptacle K may be of any length required.

The operation of my device is as follows: Wire is fed through the loop or guide F and is received upon the mandrel D, which mandrel may be of any fashion of cross-section, according to the shape of the coil to be made. As the mandrel revolves the coiled rod is discharged by its impingement against the surface E, and as discharged it is received within the receptacle K, which revolves in the same direction and with the same or nearly the same rapidity as the mandrel D. During this operation the roller G, by its pressure, retains the rod in proper juxtaposition with its mandrel or former, and the spring H operates to insure a steady and uniform action of said pressing-roller G.

What I claim is—

In a machine for coiling metal bars or rods, the combination, with a presser device and a rock-shaft to which it is rigidly secured, of an arm rigidly secured to the shaft, a pivotal lever, and a spring interposed between the latter and said arm, substantially as set forth.

In testimony whereof I have signed my name to this specification in the presence of two subscribing witnesses.

PHILANDER H. STANDISH.

Witnesses:
JNO. CROWELL, Jr.,
W. E. DONNELLY.